(12) United States Patent
Fu et al.

(10) Patent No.: US 7,863,850 B2
(45) Date of Patent: Jan. 4, 2011

(54) APPARATUS, SYSTEM, AND METHOD FOR SIMULATING OUTPUTS OF A RESOLVER TO TEST MOTOR-RESOLVER SYSTEMS

(75) Inventors: David T Fu, Rochester, MI (US); Wei D. Wang, Troy, MI (US); Steven E. Schulz, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 11/747,548

(22) Filed: May 11, 2007

(65) Prior Publication Data

US 2008/0278106 A1 Nov. 13, 2008

(51) Int. Cl.
*G05B 19/31* (2006.01)
(52) U.S. Cl. .................. 318/605; 318/661; 318/400.39
(58) Field of Classification Search .................. 318/602, 318/605, 660, 400.39, 661, 668, 560, 565; 341/112, 116, 117, 120, 147; 702/66, 185, 702/163, 94, 108, 112, 150, 121
See application file for complete search history.

(56) References Cited

U.S. PATENT DOCUMENTS

| | | | | |
|---|---|---|---|---|
| 3,855,514 | A * | 12/1974 | Zwitter et al. ............... | 318/660 |
| 3,996,454 | A * | 12/1976 | Froyd ......................... | 318/565 |
| 4,740,778 | A * | 4/1988 | Harding et al. ............. | 340/635 |
| 4,857,926 | A * | 8/1989 | Neglia et al. ................ | 341/116 |
| 4,933,674 | A * | 6/1990 | Gasperi et al. .............. | 341/116 |
| 5,162,798 | A * | 11/1992 | Yundt ......................... | 341/116 |
| 5,173,696 | A * | 12/1992 | Howard et al. .............. | 341/117 |
| 5,198,739 | A * | 3/1993 | Taylor et al. ................ | 318/661 |
| 5,357,181 | A * | 10/1994 | Mutoh et al. ................ | 318/139 |
| 5,453,684 | A * | 9/1995 | Nakayama ............. | 324/207.12 |
| 5,677,686 | A * | 10/1997 | Kachi et al. ................... | 341/8 |
| 6,084,376 | A * | 7/2000 | Piedl et al. ................... | 318/605 |
| 6,205,009 | B1 * | 3/2001 | Clark et al. ................... | 361/78 |
| 6,389,373 | B1 * | 5/2002 | Ohya ......................... | 702/189 |
| 6,418,388 | B1 * | 7/2002 | Dietmayer ................... | 702/95 |
| 6,522,097 | B2 * | 2/2003 | Fujimoto et al. ............ | 318/605 |
| 6,556,937 | B1 * | 4/2003 | Byers ......................... | 702/116 |
| 6,577,957 | B2 * | 6/2003 | Fujimoto et al. ............. | 702/36 |
| 6,778,922 | B2 * | 8/2004 | Yoon ........................... | 702/72 |
| 6,803,781 | B2 * | 10/2004 | Kobayashi et al. .......... | 324/772 |
| 6,891,492 | B1 * | 5/2005 | Kushihara ................... | 341/155 |

(Continued)

*Primary Examiner*—Walter Benson
*Assistant Examiner*—Antony M Paul
(74) *Attorney, Agent, or Firm*—Ingrassia Fisher & Lorenz, P.C.

(57) ABSTRACT

An apparatus, system, and method are provided for simulating outputs of a resolver. One apparatus includes an adjustable sine waveform generator for simulating first and second sine wave signals, and an adjustable cosine waveform generator for simulating first and cosine wave signals. The apparatus also includes an adjustable waveform generator and an adjustable gain circuit coupled to the sine waveform generator and cosine waveform generator. The system includes a device simulating a resolver coupled to a motor controller. The device includes an adjustable sine waveform generator and an adjustable cosine waveform generator coupled to an adjustable waveform generator and an adjustable gain circuit. One method includes transmitting a signal simulating at least one resolver fault condition to a motor controller to determine if the motor controller detects the fault condition(s). If the motor controller fails to detect the fault condition(s) and/or transmit an error message, the motor controller is malfunctioning.

18 Claims, 5 Drawing Sheets

U.S. PATENT DOCUMENTS

| | | | |
|---|---|---|---|
| 6,972,700 B2 * | 12/2005 | Kanekawa et al. | 341/116 |
| 6,980,134 B2 * | 12/2005 | Ely et al. | 341/20 |
| 7,002,318 B1 * | 2/2006 | Schulz et al. | 318/782 |
| 7,009,535 B2 * | 3/2006 | Kanekawa et al. | 341/116 |
| 7,012,399 B2 * | 3/2006 | Suzuki | 318/661 |
| 7,047,145 B2 * | 5/2006 | Ishizuka et al. | 702/94 |
| 7,054,783 B2 * | 5/2006 | Morishita | 702/147 |
| 7,123,175 B2 * | 10/2006 | Katakura et al. | 341/112 |
| 7,140,175 B2 * | 11/2006 | Verniau | 60/243 |
| 7,164,251 B2 * | 1/2007 | Morishita | 318/727 |
| 7,205,775 B2 * | 4/2007 | Kreit | 324/654 |
| 7,251,575 B2 * | 7/2007 | Hiller | 702/94 |
| 7,286,068 B2 * | 10/2007 | Stanley et al. | 341/120 |
| 7,298,137 B2 * | 11/2007 | Howard et al. | 324/207.24 |
| 7,343,254 B2 * | 3/2008 | Otsuka et al. | 702/58 |
| 7,357,041 B2 * | 4/2008 | Morishita | 73/862.326 |
| 7,603,250 B2 * | 10/2009 | Nishimoto et al. | 702/151 |
| 2007/0201171 A1 * | 8/2007 | Kanekawa et al. | 361/42 |

\* cited by examiner

APPARATUS, SYSTEM, AND METHOD FOR SIMULATING OUTPUTS OF A RESOLVER TO TEST MOTOR-RESOLVER SYSTEMS

FIELD OF THE INVENTION

The present invention generally relates to motors, and more particularly relates to an apparatus, system, and method for electronically simulating outputs of a resolver to test motor-resolver systems.

BACKGROUND OF THE INVENTION

A motor-resolver system is typically employed to accurately sense and control the position of a rotating shaft of the motor. During operation, as the motor drives the shaft, the motor also drives a resolver, which is used to sense the angle of velocity and position of the shaft. The output of the resolver is fed to a motor controller, which in turn, controls the motor. When a resolver error is detected, the motor controller notifies the user with an error message (e.g., a visual warning, an audio warning, etc.).

There are times, however, when the motor controller malfunctions and transmits a warning to the user indicating that the resolver is not working properly when in fact, it is the motor controller that is not working properly. It is therefore desirable to provide an apparatus, system, and method for simulating resolver signals (both fault signals and signals representing a properly functioning resolver) to determine which of the resolver or the motor controller is malfunctioning when the user receives an error message. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various exemplary embodiments of the invention include an apparatus for providing simulation signals to a motor controller of the type that receives a first sine wave signal, a second sine wave signal, a first cosine wave signal, and a second cosine wave signal, and generates a positive excitation signal and a negative excitation signal. One apparatus includes an adjustable sine waveform generator for simulating the first sine wave signal and the second sine wave signal, the sine waveform generator including a first input and a second input. An adjustable cosine waveform generator simulates the first cosine wave signal and the second cosine wave signal, the adjustable cosine wave including a third input and a fourth input. An adjustable waveform generator has a first output coupled to the first input and to the third input. Furthermore, the apparatus also includes an adjustable gain circuit configured to receive the positive excitation signal and the negative excitation signal, and also includes a second output coupled to the second input and to the fourth input.

Other exemplary embodiments of the invention provide a method for simulating outputs of a resolver to test motor-resolver systems. One method includes transmitting a first signal simulating at least one resolver fault condition to a motor controller to determine if the motor controller detects the resolver fault condition(s) and/or transmits a first error message in response to the first signal. If the motor controller fails to transmit the first error message in response to the first signal, the motor controller is malfunctioning.

Various other exemplary embodiments provide a system including a motor controller coupled to a resolver simulator. The motor controller is configured to receive a first sine wave signal, a second sine wave signal, a first cosine wave signal, and a second cosine wave signal, and configured to output a positive excitation signal and a negative excitation signal. The resolver simulator is configured similar to the apparatus discussed above.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
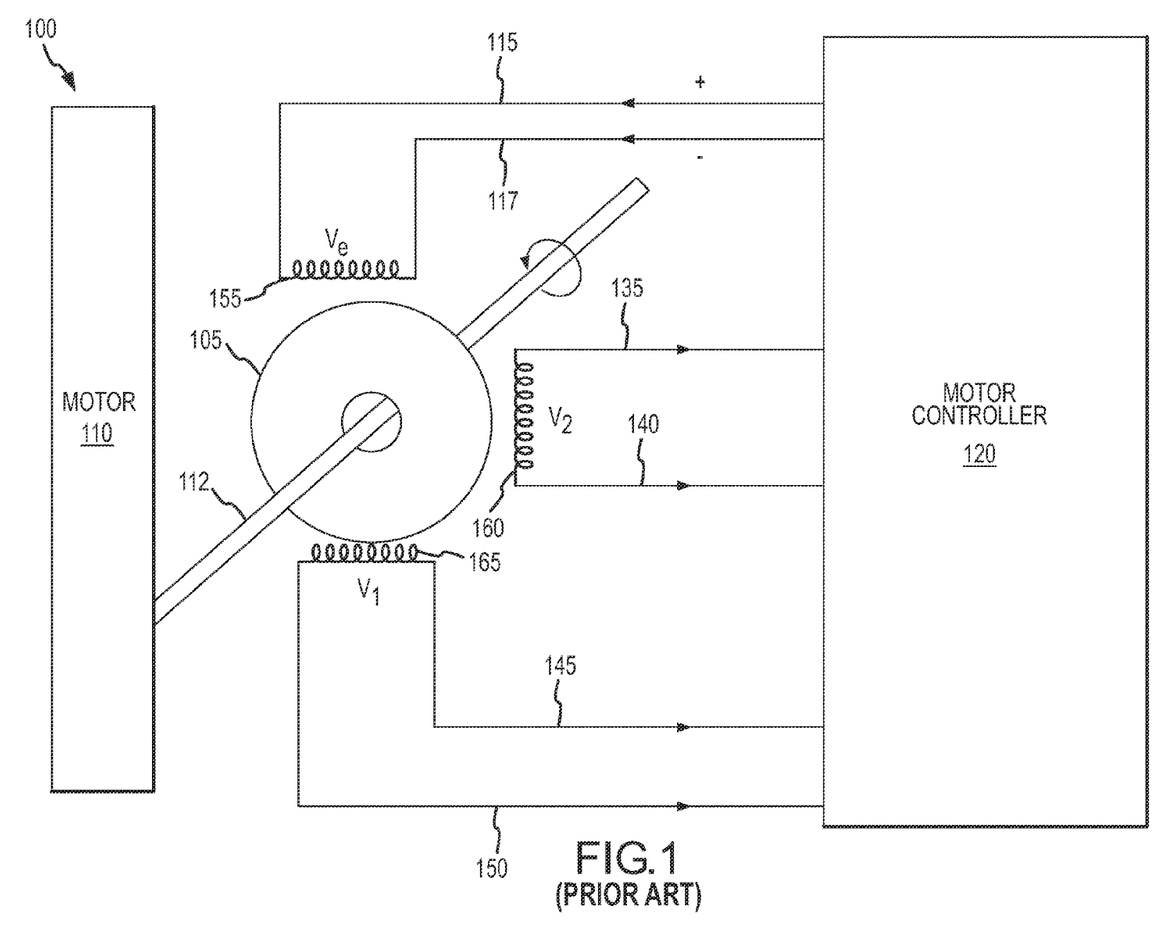
FIG. 1 is a schematic diagram of a prior art motor-resolver system.

FIG. 1 is a schematic diagram of a motor-resolver system 100 that includes a resolver 105 coupled to a motor 110 via a motor shaft 112 and coupled to a motor controller 120. Resolver 105 is coupled to motor controller 120 via a of pair inputs (e.g., a negative excitation input 117 and a positive excitation input 115), a pair of sine wave feedback outputs (e.g., a sine wave feedback output 135 and a sine wave feedback output 140), and a pair of cosine wave feedback outputs (e.g., a cosine wave feedback output 145 and a cosine wave feedback output 150). The pair of inputs and each pair of outputs include a winding (e.g., winding 155, winding 160, and winding 165, respectively) coupled to resolver 105.

When malfunctioning, motor-resolver system 100 may exhibit one or more fault conditions. One fault condition is known as a "loss of tracking" condition. This occurs when motor 110 is rotating the motor shaft too quickly or is accelerating excessively, both of which leads to the inability of resolver 105 to correctly follow the shaft position.

A "degraded signal" is another fault condition that may occur in motor-resolver system 100. A degraded signal condition occurs when the peak-to-peak voltage amplitude of a sine wave and/or a cosine wave is greater than a pre-determined threshold. Since motor-resolver system 100 includes two sine wave feedback outputs and two cosine feedback outputs, there are multiple possible degraded signal fault conditions.

Another fault condition that may be experienced by motor-resolver system 100 is a "loss of signal" condition. A loss of signal condition occurs when the peak-to-peak voltage amplitude of a sine wave and/or a cosine wave is less than a pre-determined threshold. Since motor-resolver system 100 includes two sine wave feedback outputs and two cosine feedback outputs, there are multiple possible loss of signal fault conditions.

A "short circuit" condition is another fault condition that may be experienced by motor-resolver system 100. A short circuit condition is detected when the DC bias of the signals output by the pair of sine wave feedback outputs and/or the pair of cosine wave feedback outputs is either too high or too low. Since motor-resolver system 100 includes one pair of sine wave feedback outputs and one pair of cosine feedback outputs that may be outputting signals with a DC bias that is either too high or too low, there are multiple possible short circuit fault conditions.

When one or more of the fault conditions is present in motor-resolver system 100, motor controller 120 is configured to detect the fault condition and transmit a warning to a user in response thereto. As discussed above, however; when motor controller 120 is malfunctioning, motor controller 120 may transmit an error message (i.e., a false warning) even when motor 110 is functioning properly.

The following description of the invention is merely exemplary in nature and is not intended to limit the invention, the application of the invention, and/or uses of the invention. Furthermore, there is no intention to be bound by any theory presented in the preceding sections or the following sections.

Figure 2:
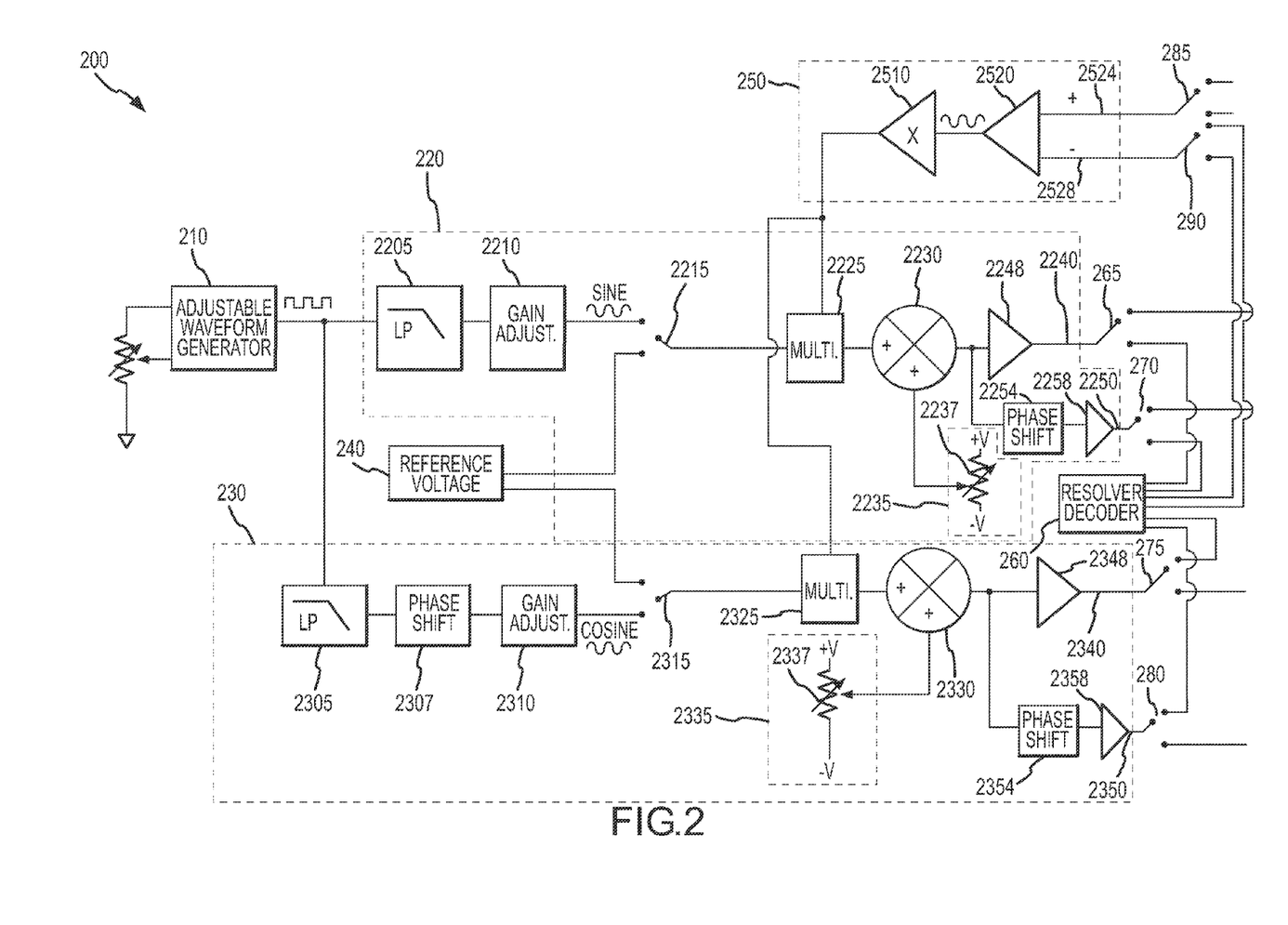
FIG. 2 is a schematic diagram of one exemplary embodiment of a device for simulating one or more conditions in a motor-resolver system.

FIG. 2 is a schematic diagram of one exemplary embodiment of a device 200 (e.g., a resolver simulator) for simulating one or more conditions (both fault conditions and normal conditions) in motor-resolver system 100. Device 200 includes an adjustable waveform generator 210 configured to generate waves (e.g., square waves) representing an output of a motor in revolutions-per-minute (RPMs). Moreover, the frequency of the signals generated by waveform generator 210 may be adjusted to simulate a "loss of tracking" fault condition of a motor (i.e., the shaft is rotating too fast or accelerating excessively). The output of waveform generator 210 is coupled to one input of a sine wave circuit 220 and to one input of a cosine wave circuit 230.

Sine wave circuit 220 is configured to simulate a pair of sine wave feedback outputs (e.g., sine wave feedback outputs 135 and 140). To accomplish this, sine wave circuit 220 includes a low pass filter 2205 having an output coupled to an input of a gain adjustment circuit 2210. Low pass filter 2205 and gain adjustment circuit 2210 operate to transform the square waves generated by waveform generator 210 into sine waves. Outputs from gain adjustment circuit 2210 represent the fundamental (modulating) frequency of resolver 105.

Also included in sine wave circuit 220 is a switch 2215 (e.g., a single pole, double throw (SPDT) switch) to selectively couple an output of gain adjustment circuit 2210 or reference voltage 240 (discussed below) to one input of a signal multiplier circuit 2225. Another input of signal multiplier circuit 2225 is coupled to an output of gain circuit 250 (discussed below). Upon receipt of signals from gain circuit 250 and gain adjustment circuit 2210 or reference voltage 240, signal multiplier circuit 2225 produces an output that is the product of the received signals. That is, the output of signal multiplier circuit 2225 is the product of signals from gain circuit 250 and signals from gain adjustment circuit 2210, or the product of signals from gain circuit 250 and signals from reference voltage 240.

The output of signal multiplier circuit 2225 is coupled to one input of an adder 2230. A second input of adder 2230 is coupled to an adjustable DC offset circuit 2235. Adder 2230 combines the output of signal multiplier 2225 with the output of DC offset circuit 2235.

DC offset circuit 2235 is configured to adjustably (either automatically and/or manually) increase or decrease the DC bias (via, for example, a potentiometer 2237) of the sine waves generated by sine wave circuit 220 to simulate a short circuit condition or a non-short circuit condition.

The output of adder 2230 is coupled to an input of a buffer 2248 and coupled to an input of a phase shift circuit 2254. Buffer 2248 amplifies signals received from adder 2230, and the output of buffer 2248 is coupled to one output 2240 of sine wave circuit 220.

Phase shift circuit 2254 shifts the phase of the signals received from adder 2230 by 180 degrees. The output of phase shift circuit 2254 is coupled to a buffer 2258, and the output of buffer 2258 forms another output 2250 of sine wave circuit 220 that is out of phase by 180 degrees with respect to output 2240.

Cosine wave circuit 230 is configured to simulate a pair of cosine wave feedback outputs (e.g., cosine wave feedback outputs 145 and 150). Cosine wave circuit 230 includes an output of a low pass filter 2305 coupled to an input of a phase shift circuit 2307. The output of phase shift circuit 2307 is coupled to the input of a gain adjustment circuit 2310. Low pass filter 2305, phase shift circuit 2307, and gain adjustment circuit 2310 operate to transform the square waves generated by waveform generator 210 into cosine waves. That is, the signals output by gain adjustment circuit 2310 are 90 degrees out of phase with respect to the signals output by gain adjustment circuit 2210.

Also included cosine wave circuit 230 is a switch 2315 (e.g., a single pole, double throw (SPDT) switch) to selectively couple an output of gain adjustment circuit 2310 or reference voltage 240 (discussed below) to one input of a signal multiplier circuit 2325. Another input of signal multiplier circuit 2325 is coupled to an output of gain circuit 250 (discussed below). Upon receipt of signals from gain circuit 250 and gain adjustment circuit 2310 or reference voltage 240, signal multiplier circuit 2325 produces an output that is the product of the received signals. That is, the output of signal multiplier circuit 2325 is the product of signals from gain circuit 250 and signals from gain adjustment circuit 2310, or the product of signals from gain circuit 250 and signals from reference voltage 240.

The output of signal multiplier circuit 2325 is coupled to one input of an adder 2330. A second input of adder 2330 is coupled to an adjustable DC offset circuit 2335. Adder 2330 combines the output of signal multiplier 2325 with the output of DC offset circuit 2335.

DC offset circuit 2335 is configured to adjustably (either automatically and/or manually) increase or decrease the DC bias (via, for example, a potentiometer 2337) of the cosine waves generated by cosine wave circuit 230 to simulate a short circuit condition or a non-short circuit condition.

The output of adder 2330 is coupled to an input of a buffer 2348 and coupled to an input of a phase shift circuit 2354. Buffer 2348 amplifies signals received from adder 2330, and the output of buffer 2348 is coupled to one output 2340 of cosine wave circuit 230.

Phase shift circuit 2354 shifts the phase of the signals received from adder 2330 by 180 degrees. The output of phase shift circuit 2354 is coupled to a buffer 2358, and the output of buffer 2358 forms another output 2350 of cosine wave circuit 230 that is out of phase by 180 degrees with respect to output 2340.

As discussed above, device 200 includes a reference voltage 240 selectively coupled to the input of multiplier circuit 2225 (another input of sine wave circuit 220) and the input of multiplier circuit 2325 (another input of cosine wave circuit 230) via switches 2215 and 2315, respectively. Reference voltage 240 operates to simulate a motor at rest (i.e., rotating at zero RPMs). Because of reference voltage 240 and waveform generator 210, device 200 is capable of simulating motor speeds from zero RPMs to speeds greater than the normal operating speed of motor-resolver system 100.

Device 200 also includes a gain circuit 250 including an output coupled to another input of multiplier circuit 2225 and to another input of multiplier circuit 2325. The outputs of gain circuit 250 have a higher carrier frequency to adjust (automatically and/or manually) the voltage amplitudes of the sine waves produced by sine wave circuit 220 and the cosine waves produced by cosine wave circuit 230. That is, gain circuit 250 is capable of adjusting the peak-to-peak voltage amplitudes of the sine waves and/or the cosine waves to simulate degraded signal fault conditions and/or loss of signal fault conditions depending upon whether the peak-to-peak amplitudes are greater than a threshold voltage amplitude or less than a threshold voltage amplitude. Moreover, gain circuit 250 is capable of manipulating the peak-to-peak voltage amplitudes of the sine waves and/or the cosine waves to simulate a "properly functioning" signal.

To accomplish such, gain circuit 250 includes a buffer 2510 coupled to the inputs of multiplier circuits 2225 and 2325 discussed above. The input of buffer 2510 is coupled to the output of a differential amplifier 2520. Moreover, differential amplifier 2520 includes a positive excitation input 2524 and a negative excitation input 2528 capable of being coupled to or in fact coupled to motor controller 120 (see FIG. 3).

Device 200 also includes a resolver decoder 260 for self-calibrating device 200 prior to testing a motor controller (e.g., motor controller 120). Resolver decoder 260 is configured to be substantially similar to a resolver decoder (not shown) included as a portion of motor controller 120. To self-calibrate device 200, waveform generator 210, DC offset circuit 2235, DC offset circuit 2335, and gain circuit 250 are each adjusted so that device 200 does not produce one or more fault conditions. That is, device 200 outputs signals from sine wave circuit 220 and cosine wave circuit 230 to resolver decoder 260 representing a correctly functioning motor-resolver system 100. Because resolver decoder 260 is substantially similar to the resolver decoder in motor controller 120, device 200 is also properly calibrated for motor controller 120.

As illustrated in FIG. 2, sine wave output 2240 is selectively coupled to the input of resolver decoder 260 or to the input of the motor controller via a switch 265 (e.g., an SPDT switch). Similarly, sine wave output 2250 (which has been shifted by 180 degrees with respect to output 2240) is selectively coupled to the input of resolver decoder 260 or to the input of the motor controller via a switch 270 (e.g., an SPDT switch).

Cosine wave output 2340 is selectively coupled to the input of resolver decoder 260 or to the input of the motor controller via a switch 275 (e.g., an SPDT switch). Moreover, cosine wave output 2350 (which has been shifted by 180 degrees with respect to output 2340) is selectively coupled to the input of resolver decoder 260 or to the input of the motor controller via a switch 280 (e.g., an SPDT switch). That is, sine wave output 2240, sine wave output 2250, cosine wave output 2340, and cosine wave output are coupled to the input of resolver decoder 260 when device 200 is being self-calibrated, and coupled to the input of the motor controller when device 200 is testing the motor controller.

In addition, positive excitation input 2524 is selectively coupled to the output of resolver decoder 260 or the output of the motor controller via a switch 285 (e.g., an SPDT switch) and negative excitation input 2528 is selectively coupled to the output of resolver decoder 260 or the output of the motor controller via a switch 290 (e.g., an SPDT switch). That is, positive excitation input 2524 and negative excitation input 2528 are coupled to the output of resolver decoder 260 when device 200 is being self-calibrated, and coupled to the output of the motor controller when device 200 is testing the motor controller.

During an exemplary operational mode, various inputs to device 200 may be manually and/or automatically adjusted to simulate one or more of the fault conditions discussed above or a properly operating condition to determine if the motor controller is functioning properly. For example, the frequency of signals produced by waveform generator 210 may be increased so that the outputs of sine wave output 2240, sine wave output 2250, cosine wave output 2340, and/or cosine wave output 2350 simulate a loss of tracking fault condition. In another example, the DC bias of the outputs of sine wave output 2240 and sine wave output 2250, and/or cosine wave output 2340 and cosine wave output 2350 may be adjusted to be too high or too low to simulate a short circuit fault condition. Furthermore, the voltage gain produced by gain circuit 250 may be increased or decreased so that the peak-to-peak voltage amplitude of the outputs of sine wave output 2240, sine wave output 2250, cosine wave output 2340, and/or cosine wave output 2350 are less than or greater than a predetermined threshold to simulate a loss of signal fault condition or degraded signal fault condition, respectively. In addition, the outputs may include a frequency, DC bias, and peak-to-peak voltage simulating a properly functioning motor-resolver system. Accordingly, device 200 is capable of simulating the fault conditions discussed above with reference to motor-resolver system 100, as well as a properly functioning motor-resolver system 100.

Figure 3:
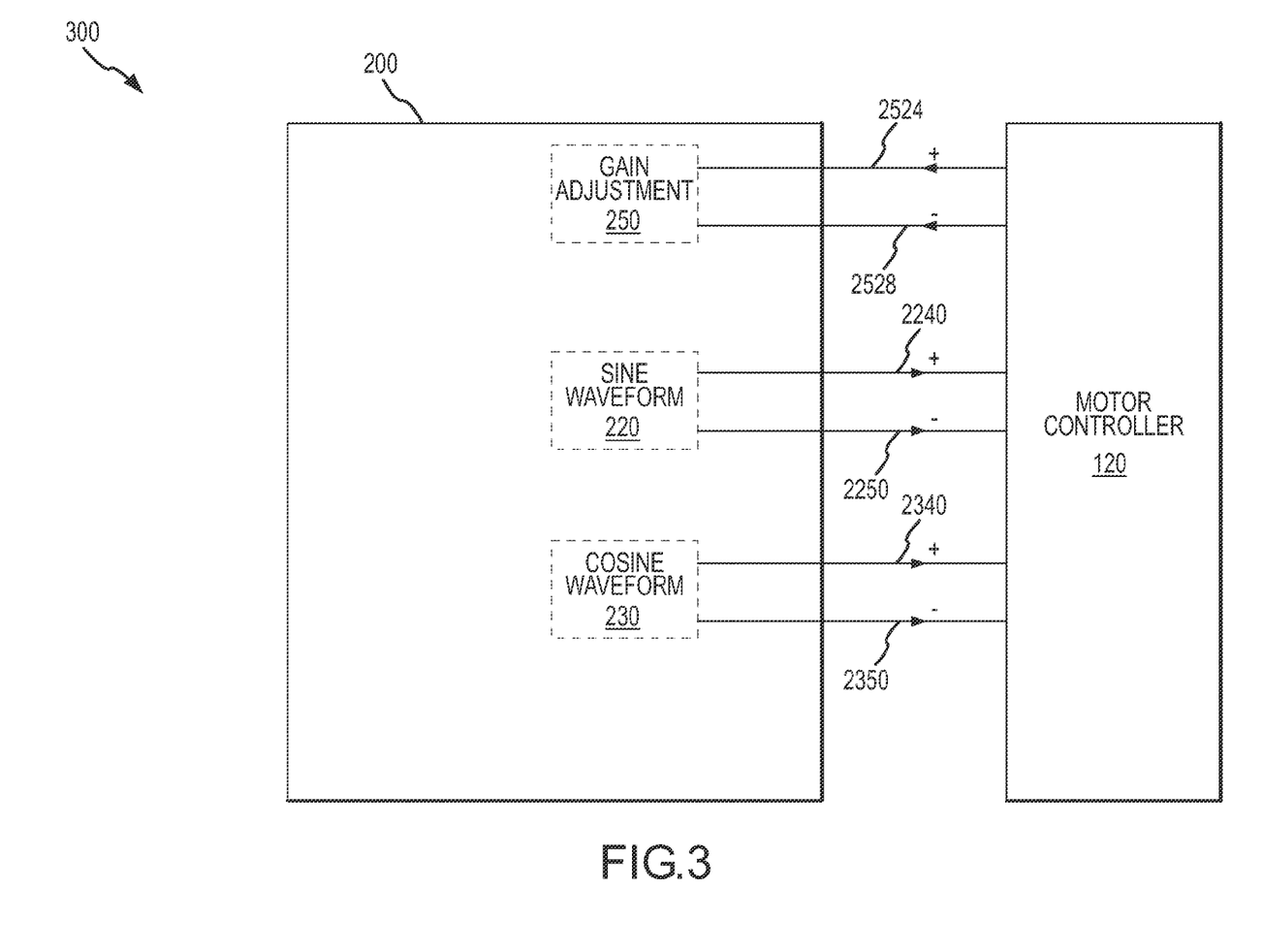
FIG. 3 is a schematic diagram of an exemplary system for testing the motor controller of FIG. 1.

FIG. 3 is a schematic diagram of an exemplary embodiment of a system 300 for simulating resolver fault conditions to test motor controller 120. As discussed above, motor controller 120 is configured to detect the occurrence of one or more fault conditions of motor-resolver system 100 and transmit a warning to a user indicating that a fault condition exists. Furthermore, motor controller 120 includes a resolver decoder (not shown) that is configured substantially similar to resolver decoder 260 (see FIG. 2), which enables device 200 to test motor controller 120 based on the calibration by resolver decoder 260.

As illustrated in FIG. 3, motor controller 120 is at least temporarily coupled to device 200 to test motor controller 120. That is, motor controller 120 is coupled to and receives signals from sine wave output 2240, sine wave output 2250, cosine wave output 2340, and cosine wave output 2350. Furthermore, motor controller 120 is coupled to and transmits input signals to positive excitation input 2524 and negative excitation input 2528.

In accordance with one exemplary mode of operation of system 300 (after self-calibration), waveform generator 210 (see FIG. 2), gain circuit 250, DC offset circuit 2235 (see FIG. 2), and/or DC offset circuit 2335 (see FIG. 2) are adjusted to produce an output signal to motor controller 120 that simulates one or more of the fault conditions discussed above. If functioning properly, motor controller 120 will detect the fault condition and transmit a warning indicating that a fault condition exists, but will not detect the fault condition and transmit the warning when motor controller 120 is malfunctioning.

Similarly, device 200 may transmit "correct" signals to motor controller 120 to determine if motor controller 120 is properly transmitting the warning to a user. That is, the simulated motor speed, DC offset, and amplitudes of the output signals are each within their respective "normal" ranges. In this situation, motor controller 120 should not transmit a warning signal. If motor controller 120 does transmit a warning signal, then motor controller 120 is malfunctioning.

Accordingly, system 300 (e.g., via device 200) is capable of determining whether motor controller 120 is functioning properly or should be replaced. Furthermore, if motor controller 120 is functioning properly and transmitting a warning, then the user can determine that the resolver side of motor-resolver system 100 is malfunctioning.

Figure 4:
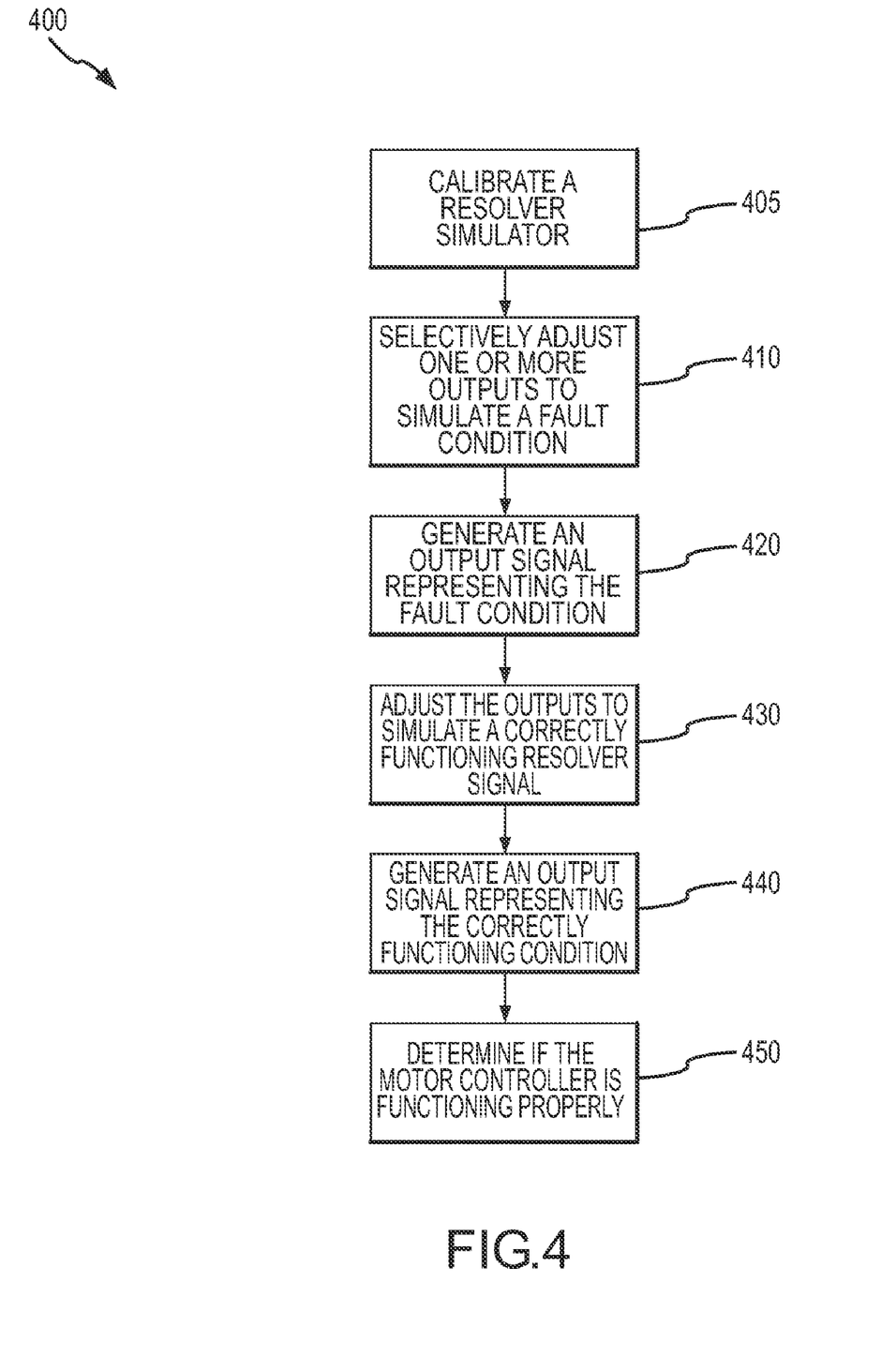
FIG. 4 is a flow diagram representing one exemplary embodiment of a method for electrically simulating one or more conditions of the motor-resolver system of FIG. 1.

FIG. 4 is a flow diagram representing one exemplary embodiment of a method 400 for producing at least one output signal having a plurality of characteristics (e.g., amplitude, DC bias, frequency, etc.) simulating at least one fault condition of a motor-resolver system (e.g., motor-resolver system 100) in a device (e.g., device 200). Method 400 begins by calibrating device 200 (step 405), which may be a self-calibration.

After calibration, one or more of a plurality of outputs is selectively adjusted to simulate a fault condition (step 410). The adjustment may be made to an adjustable waveform generator (e.g., waveform generator 210) to increase the frequency of the wave such that the output signals of device 200 include a frequency greater than a threshold frequency to simulate a loss of tracking fault condition. The adjustment may be made to an adjustable DC offset circuit (e.g., DC offset circuit 2235 or DC offset circuit 2335) to increase the DC bias of the output signals of device 200 greater than a threshold DC bias or decrease the DC bias of the output signals of device 200 less than a threshold DC bias to simulate a short circuit fault condition. The adjustment may be made to a gain circuit (e.g., gain circuit 250) to increase the voltage amplitude of the output signals of sine wave circuit 220 and/or cosine wave circuit 230 above a pre-determined threshold to simulate a degraded signal fault condition. The adjustment may be made to gain circuit 250 to decrease the voltage amplitude of signals produced by sine wave circuit 220 and/or cosine wave circuit 230 below a pre-determined threshold to simulate a loss of signal fault condition. Once a fault condition is simulated, an output signal representing the fault condition of the resolver is generated (step 420).

Method 400 also includes adjusting the plurality of outputs to simulate a "correctly functioning" resolver signal (step 430) and generating a properly functioning output signal (step 440). That is, the correctly functioning signal simulates a motor speed within a pre-determined range of speeds, includes a DC bias within a pre-determined range (e.g., 0 to 12 volts) to simulate a non-short circuit condition, and peak-to-peak voltage amplitudes of the sine waves and cosine waves within a pre-determined range. Furthermore, method 400 includes determining whether motor controller 120 is functioning properly based upon whether a fault condition is detected or a proper a signal is detected, depending upon whether the output signal is based upon the adjustments of step 410 or step 430, respectively.

Figure 5:
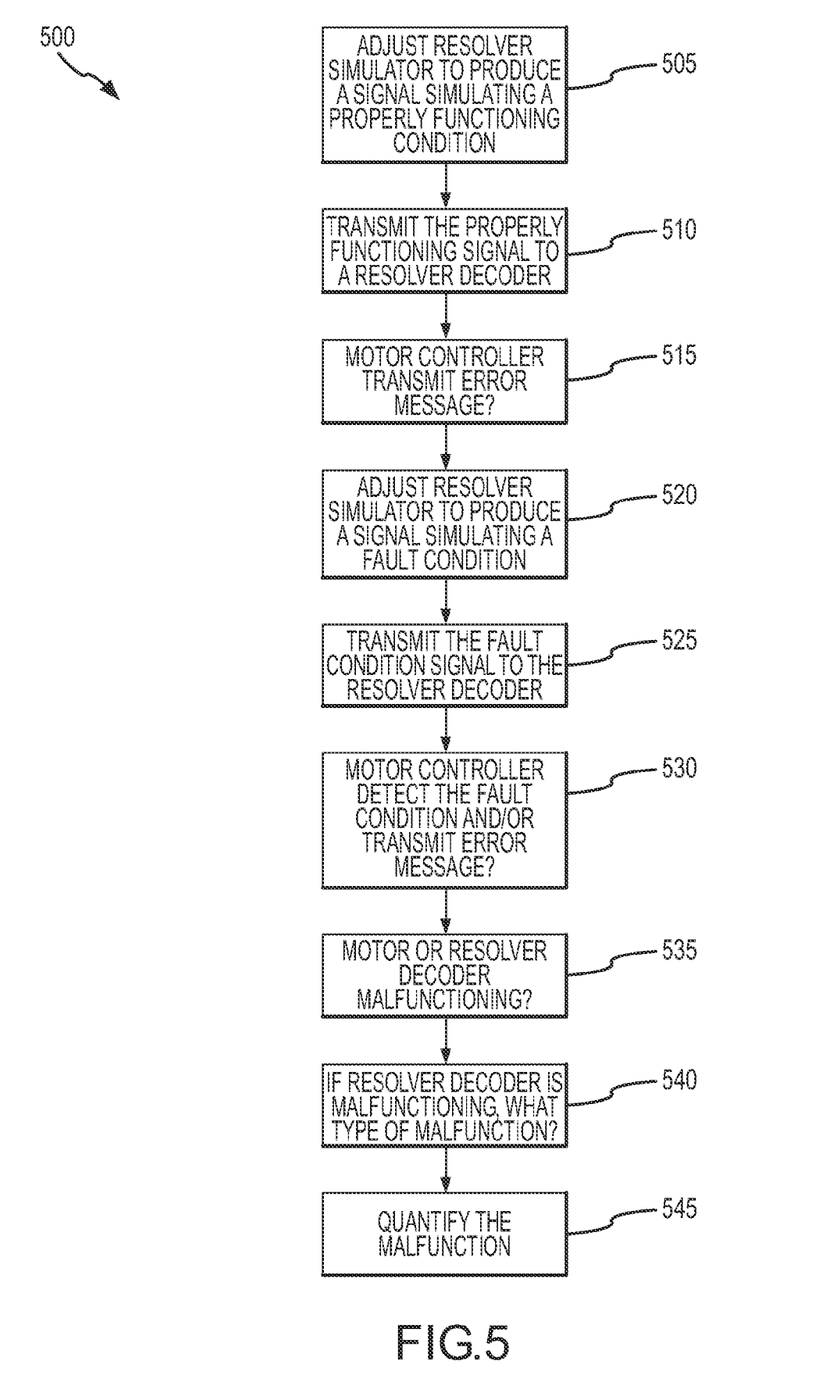
FIG. 5 is a flow diagram representing an exemplary embodiment of one method for testing the motor-resolver system of FIG. 1.

FIG. 5 is a flow diagram representing an exemplary embodiment of one method 500 for testing motor-resolver system 100. Method 500 begins by adjusting a resolver simulator (e.g., device 200) to produce a simulated resolver signal representing a properly functioning condition (i.e., a non-fault operating condition) (step 505).

The simulated properly functioning resolver signal should include a voltage within a range indicating that a motor is experiencing neither a degraded signal fault condition nor a loss of signal fault condition. To accomplish such, gain circuit 250 (see FIG. 2) is adjusted so that the signal output by gain circuit 250 to each of, for example, multiplier circuits 2225 and 2325 (see FIG. 2) is such that each of the sine wave signals and each of the cosine wave signals output by resolver simulator 200 includes a voltage within the pre-determined range.

In addition, the simulated properly functioning resolver signal should include a DC bias within a range indicating that the motor is not experiencing a short circuit fault condition. To accomplish such, DC offset circuits 2235 and 2335 (see FIG. 2) are adjusted so that the signal added to, for example, adders 2230 and 2330 (see FIG. 2) is such that each of the sine wave signals and each of the cosine wave signals output by resolver simulator 200 includes a DC bias in the range of about 0 volts to about 12 volts.

So that the simulated properly functioning resolver signal does not simulate a loss of tracking fault condition, the simulated properly functioning resolver signal should include a frequency representing a motor speed less than a maximum threshold speed. For this to occur, waveform generator 210 is adjusted so that the frequency of each of the sine wave signals and each of the cosine wave signals output by resolver simulator 200 is within a pre-determined range.

After resolver simulator 200 is coupled to a resolver decoder (e.g., resolver decoder 260), the simulated properly functioning resolver signal is transmitted to resolver decoder 260 (step 510) to determine if motor controller 120 transmits an error message (i.e., a false error message) in response to the simulated properly functioning resolver signal (step 515).

Resolver simulator 200 is also adjusted to produce a signal simulating a fault condition (i.e., a malfunction) (step 520). The simulated fault condition signal is transmitted to resolver decoder 260 (step 525) to determine if motor controller 120 detects the fault condition and/or transmits an error message in response to the simulated fault condition signal (step 530).

Once steps 505 through 530 have been performed, it can be determined which of resolver 105 and resolver decoder 260 is malfunctioning (step 535). If motor controller 120 transmits a false error message in response to the properly functioning resolver signal or fails to detect the fault condition and/or transmit an error message in response to the simulated fault condition signal, resolver decoder 260 is malfunctioning. If motor controller 120 fails to transmit a false error message in response to the properly functioning resolver signal and transmits an error message in response to the simulated fault condition signal, resolver 105 is malfunctioning.

If resolver decoder 260 is malfunctioning, the type of malfunction resolver decoder 260 is experiencing can be determined (step 540). That is, resolver simulator 200 may be used to identify if the malfunction resolver decoder 260 is experiencing is associated with detection of a loss of tracking fault condition, a loss of signal fault condition, a degraded fault condition, and/or a short circuit fault condition.

To determine if the malfunction resolver decoder 260 is experiencing is associated with detection of a loss of tracking fault condition, resolver simulator 200 transmits one or more signals simulating a motor rate of speed. The rate of speed of the simulated signals may initially be within a range simulating a properly functioning resolver. The speed may then be increased (either instantaneously or gradually) to simulate a rate of speed greater than a maximum threshold speed to determine if motor controller transmits an error message in response to the simulated speed being greater than the maximum threshold speed. If motor controller 120 transmits an error message in response to the simulated speed being greater than the maximum threshold speed, resolver decoder 260 is not experiencing a malfunction associated with detecting a loss of tracking fault condition. Alternatively, if motor controller 120 fails to transmit an error message in response to the simulated speed being greater than the maximum threshold speed, resolver decoder 260 is experiencing a malfunction associated with detecting a loss of tracking fault condition.

In determining if the malfunction resolver decoder 260 is experiencing is associated with detection of a degraded signal fault condition, resolver simulator 200 transmits one or more signals simulating a resolver peak-to-peak voltage amplitude. The voltage of the simulated signals may initially be within a range of voltages simulating a properly functioning motor. The voltage may then be increased (either instantaneously or gradually) to simulate a peak-to-peak voltage greater than a maximum threshold voltage to determine if motor controller transmits an error message in response to the simulated voltage being greater than the maximum threshold voltage. If motor controller 120 transmits an error message in response to the simulated voltage being greater than the maximum threshold voltage, resolver decoder 260 is not experiencing a malfunction associated with detecting a loss of signal fault condition. Alternatively, if motor controller 120 fails to transmit an error message in response to the simulated voltage being greater than the maximum threshold voltage, resolver decoder 260 is experiencing a malfunction associated with detecting a loss of signal fault condition.

To determine if the malfunction resolver decoder 260 is experiencing is associated with detection of a loss of signal fault condition, resolver simulator 200 transmits one or more signals simulating a resolver peak-to-peak voltage amplitude. The voltage of the simulated signals may initially be within the range of voltages simulating a properly functioning resolver. The voltage may then be decreased (either instantaneously or gradually) to simulate a peak-to-peak voltage less than a minimum threshold voltage to determine if motor controller transmits an error message in response to the simulated voltage being less than the minimum threshold voltage. If motor controller 120 transmits an error message in response to the simulated voltage being less than the minimum threshold voltage, resolver decoder 260 is not experiencing a malfunction associated with detecting a degraded signal fault condition. Alternatively, if motor controller 120 fails to transmit an error message in response to the simulated voltage being less than the minimum threshold voltage, resolver decoder 260 is experiencing a malfunction associated with detecting a degraded signal fault condition.

In determining if the malfunction resolver decoder 260 is experiencing is associated with detection of a short circuit fault condition, resolver simulator 200 transmits one or more signals simulating a resolver DC bias. The DC bias of the simulated signals may initially be within a range of DC biases (e.g., 0-12 volts) simulating a properly functioning resolver. The DC bias may then be increased (either instantaneously or gradually) and/or decreased (either instantaneously or gradually) to simulate a DC bias either greater than a maximum threshold DC bias or a DC bias below a minimum threshold DC bias, respectively, to determine if motor controller transmits an error message. If motor controller 120 transmits an error message in response to the simulated DC bias being greater than the maximum threshold DC bias and/or (depending upon whether testing one of or both of the maximum and minimum DC bias threshold(s)) being less than the minimum threshold DC bias, resolver decoder 260 is not experiencing a malfunction associated with detecting a short circuit fault condition. Alternatively, if motor controller 120 fails to transmit an error message in response to the simulated DC bias being greater than the maximum threshold DC bias and/or (depending upon whether testing one of or both of the maximum and minimum DC bias threshold(s)) being less than the minimum threshold DC bias, resolver decoder 260 is experiencing a malfunction associated with detecting a short circuit fault condition.

After the type of malfunction is determined, the magnitude of the malfunction can be quantified (step 545). The magnitude of the malfunction may be quantified by determining a threshold motor speed (for a loss of tracking fault condition), a threshold peak-to-peak voltage (for a loss of signal fault condition or a degraded signal condition), or a DC bias threshold (for a short circuit fault condition).

The threshold motor speed is the motor speed at which motor controller 120 transmits the error message in response to signals from resolver simulator 200. To determine the threshold motor speed when a loss of tracking fault condition exists, waveform generator 210 (see FIG. 2) may be adjusted (either gradually or instantaneously) so that resolver simulator 200 outputs signals simulating varying motor speeds until motor controller 120 transmits the error signal. The simulated motor speed may be started at a speed representing a properly functioning resolver signal or a speed representing the loss of tracking fault condition. The threshold motor speed may then be compared to the motor speed at which motor controller 120 should transmit the error message to quantify the loss of tracking fault condition.

The threshold peak-to-peak voltage is the voltage at which at which motor controller 120 transmits the error message in response to signals from resolver simulator 200. In determining the threshold peak-to-peak voltage when a degraded signal fault condition exists, gain circuit 250 (see FIG. 2) may be adjusted (either gradually or instantaneously) so that resolver simulator 200 outputs signals simulating varying peak-to-peak voltages until motor controller 120 transmits the error signal. The simulated peak-to-peak voltages may be started at a voltage representing a properly functioning resolver signal or a voltage representing the degraded signal fault condition. The threshold voltage may then be compared to the voltage at which motor controller 120 should transmit the error message to quantify the loss of signal fault condition. Similarly, gain circuit 250 may be adjusted (either gradually or instantaneously) so that resolver simulator 200 outputs signals simulating varying peak-to-peak voltages to determine the threshold peak-to-peak voltage when a loss of signal fault condition exists.

The threshold DC bias is the DC bias at which at which motor controller 120 transmits the error message in response to signals from resolver simulator 200. In determining the threshold DC bias when a short circuit fault condition exists, DC offset circuit 2235 and/or DC offset circuit 2335 (see FIG. 2) may be adjusted (either gradually or instantaneously) so that resolver simulator 200 outputs signals simulating varying DC biases until motor controller 120 transmits the error signal. The simulated DC biases may be started at a DC bias representing a properly functioning resolver signal or a DC bias representing the short circuit fault condition. The threshold DC bias may then be compared to the DC bias at which motor controller 120 should transmit the error message to quantify the short circuit fault condition.

Although the invention has been described above with respect to the analog domain, various embodiments also contemplate making the adjustments and/or calculations in the digital domain and converting the digital signals (e.g., via a digital signal processor (DSP) integrated circuit) into analog signals prior to transmission to the motor controller. That is, a computing device may be utilized to produce digital signals having characteristics representing a resolver loss of tracking fault condition, degraded signal fault condition, loss of signal fault condition, and/or short circuit fault condition that is transmitted to a D/A converter prior to transmission to a motor controller. Therefore, sine wave circuit 220 and/or cosine wave circuit 230 may be and adjustable digital device coupled to one or more D/A converters having an output(s) corresponding to output 2240, output 2250, output 2340, and/or output 2350.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. An apparatus for providing simulation signals to a motor controller of a type that receives a first sine wave signal, a second sine wave signal, a first cosine wave signal, and a second cosine wave signal, and generates a positive excitation signal and a negative excitation signal, the apparatus comprising:
    an adjustable sine waveform generator for simulating the first sine wave signal and the second sine wave signal, and including first and second inputs;
    an adjustable cosine waveform generator for simulating the first cosine wave signal and the second cosine wave signal, and including third and fourth inputs;
    an adjustable waveform generator including a first output coupled to the first input and to the third input; and
    an adjustable gain circuit configured to receive the positive excitation signal and the negative excitation signal, and including a second output coupled to the second input and to the fourth input,
    wherein the gain circuit is configured to vary a voltage of the second output to produce a peak-to-peak voltage amplitude, and
    wherein the gain circuit is configured to, at least one of
        simulate a degraded signal fault condition when the peak-to-peak voltage amplitude is greater than a first pre-determined threshold voltage, or
        simulate a loss of signal fault condition when the peak-to-peak voltage amplitude less than a second pre-determined threshold voltage.

2. The apparatus of claim 1, wherein the waveform generator is configured to vary a frequency of the first output to simulate a loss of tracking fault condition.

3. The apparatus of claim 1, wherein the gain circuit is configured to simulate the degraded signal fault condition.

4. The apparatus of claim 1, wherein the gain circuit is configured to simulate the loss of signal fault condition.

5. The apparatus of claim 1, further comprising an adjustable DC offset circuit in the sine waveform generator to adjust a DC bias of one of the first sine wave signal and the second sine wave signal.

6. The apparatus of claim 5, wherein the DC offset circuit is configured to adjust the DC bias above a pre-determined DC bias threshold to simulate a short circuit fault condition.

7. The apparatus of claim 5, wherein the DC offset circuit is configured to adjust the DC bias below a pre-determined DC bias threshold to simulate a short circuit fault condition.

8. The apparatus of claim 1, further comprising an adjustable DC offset circuit in the cosine waveform generator to adjust a DC bias of one of the first cosine wave signal and the second cosine wave signal.

9. The apparatus of claim 8, wherein the DC offset circuit is configured to adjust the DC bias above a pre-determined DC bias threshold to simulate a short circuit fault condition.

10. The apparatus of claim 8, wherein the DC offset circuit is configured to adjust the DC bias below a pre-determined DC bias threshold to simulate a short circuit fault condition.

11. The apparatus of claim 1, wherein the sine waveform generator comprises:
    a first low pass filter coupled to the first output, the first low pass filter configured to convert the first output to a third sine wave signal;
    a first multiplier coupled to the first low pass filter and the second output, the first multiplier configured to multiply the third sine wave signal by the second output to produce a fourth sine wave signal;
    an adjustable first DC offset circuit including a third output;
    a first adder coupled to the first multiplier and the third output, the first adder configured to combine the fourth sine wave signal and the third output to produce the first sine wave signal having a first phase; and
    a first phase shifter coupled to the first adder, the first phase shifter configured to shift the first phase to produce the second sine wave signal.

12. The apparatus of claim 11, wherein cosine waveform generator comprises:
    a second low pass filter coupled to the first output, the second low pass filter configured to convert the first output to a fifth sine wave signal having a second phase;
    a second phase shifter coupled to the second low pass filter, the second phase shifter configured to shift the second phase of the fifth sine wave signal to produce a third cosine wave signal;
    a second multiplier coupled to the second phase shifter and the second output, the second multiplier configured to multiply the third cosine wave signal by the second output to produce a fourth cosine wave signal;
    an adjustable second DC offset circuit including a fourth output;
    a second adder coupled to the second multiplier and the fourth output, the second adder configured to combine the fourth cosine wave signal and the fourth output to produce the first cosine wave signal having a third phase; and
    a third phase shifter coupled to the second adder, the third phase shifter configured to shift the third phase of the first cosine wave signal to produce the second cosine wave signal.

13. The apparatus of claim 1, further comprising a reference circuit coupled to the sine waveform generator and to the cosine waveform generator, the reference circuit configured to provide a third output representing a motor at rest.

14. The apparatus of claim 1, further comprising:
    a resolver decoder selectively coupled to the sine waveform generator, the cosine waveform generator, and the gain circuit, wherein the resolver decoder is configured to calibrate each of the sine waveform generator, the cosine waveform generator, and the gain circuit.

15. A method for testing a motor-resolver system including a resolver, the method comprising the steps of:
    transmitting a first signal simulating a resolver fault condition to the motor controller;
    determining if the motor controller detects the resolver fault condition and transmits a first error message in response to the first signal;

determining that the motor controller includes a malfunction if the motor controller fails to transmit the first error message in response to the first signal;

transmitting a second signal simulating a properly functioning condition of the motor to the motor controller;

determining if the motor controller transmits a second error message in response to the second signal;

determining that the motor controller is malfunctioning if the motor controller transmits the second error message in response to the second signal; and determining that the motor is malfunctioning if the motor controller transmits the first error message in response to the first signal and fails to transmit the second error message in response to the second signal.

16. The method of claim 15, wherein the motor controller includes the malfunction, the method further comprising the step of determining a type of fault condition causing the malfunction.

17. The method of claim 16, further comprising the step of quantifying a magnitude of the fault condition.

18. A system comprising:

a motor controller configured to receive a first sine wave signal, a second sine wave signal, a first cosine wave signal, and a second cosine wave signal, and configured to output a positive excitation signal and a negative excitation signal; and a resolver simulator coupled to the motor controller, the resolver simulator comprising:

an adjustable waveform generator configured to generate a first output, an adjustable gain circuit configured to receive the positive excitation signal and the negative excitation signal, and configured to generate a second output, an adjustable sine waveform generator coupled to the motor controller, the sine waveform generator configured to receive the first output and the second output, and configured to provide a first sine wave output simulating the first sine wave signal, and provide a second sine wave output simulating the second sine wave signal to the motor controller, and an adjustable cosine waveform generator coupled to the motor controller, the cosine waveform generator configured to receive the first output and the second output, and configured to provide a first cosine wave output simulating the first cosine wave signal and provide a second cosine wave output simulating the second cosine wave signal to the motor controller.

* * * * *